(12) United States Patent
Derkx et al.

(10) Patent No.: US 11,167,410 B2
(45) Date of Patent: Nov. 9, 2021

(54) TELESCOPIC SHAFT FOR A PARALLEL KINEMATICS ROBOT

(71) Applicant: ABB Schweiz AG, Baden (CH)

(72) Inventors: Jeroen Derkx, Enköping (SE); Daniel Lundbäck, Västerås (SE); Johan Ernlund, Västerås (SE); Mats Olsson, Västerås (SE)

(73) Assignee: ABB Schweiz AG, Baden (CH)

( * ) Notice: Subject to any disclaimer, the term of this patent is extended or adjusted under 35 U.S.C. 154(b) by 209 days.

(21) Appl. No.: 16/479,069

(22) PCT Filed: Feb. 9, 2017

(86) PCT No.: PCT/EP2017/052914
§ 371 (c)(1),
(2) Date: Jul. 18, 2019

(87) PCT Pub. No.: WO2018/145752
PCT Pub. Date: Aug. 16, 2018

(65) Prior Publication Data
US 2019/0381653 A1     Dec. 19, 2019

(51) Int. Cl.
*B25J 9/00* (2006.01)
*B25J 19/00* (2006.01)

(52) U.S. Cl.
CPC ......... *B25J 9/0051* (2013.01); *B25J 19/0016* (2013.01)

(58) Field of Classification Search
CPC ... B25J 9/0051; B25J 19/0016; F16C 2322/59
See application file for complete search history.

(56) References Cited

U.S. PATENT DOCUMENTS

| | | | | |
|---|---|---|---|---|
| 3,118,066 A | * | 1/1964 | Thomas | F16M 11/046 |
| | | | | 378/194 |
| 3,244,883 A | * | 4/1966 | Labus | A61B 6/4429 |
| | | | | 378/194 |

(Continued)

FOREIGN PATENT DOCUMENTS

| | | |
|---|---|---|
| CN | 103612684 A | 3/2014 |
| CN | 103895004 A | 7/2014 |

(Continued)

OTHER PUBLICATIONS

International Search Report and Written Opinion of the International Searching Authority Application No. PCT/EP2017/052914 Completed: May 10, 2017; dated May 18, 2017 11 pages.

(Continued)

*Primary Examiner* — Stephen A Vu
(74) *Attorney, Agent, or Firm* — Whitmyer IP Group LLC

(57) ABSTRACT

A telescopic shaft having a first shaft, a second shaft configured to enable a first relative movement in an axial direction between the first and second shafts, and a third shaft configured to enable a second relative movement in the axial direction between the second and third shafts, and a third relative movement in the axial direction between the first and third shafts. The second shaft is located between the first and third shafts. The telescopic shaft is configured to connect a base of a parallel kinematics robot to an end effector of the same for the purpose of transferring torque. By providing the telescopic shaft with more than two shafts with mutual relative movements between the same, an extension factor (the relation between the maximum and minimum lengths of the telescopic shaft) and by that the working area of the parallel kinematics robot can be increased.

15 Claims, 2 Drawing Sheets

(56) References Cited

U.S. PATENT DOCUMENTS

| | | | |
|---|---|---|---|
| 4,666,362 A | 5/1987 | Landsberger et al. | |
| 6,497,548 B1* | 12/2002 | Roy | B23Q 1/5462 |
| | | | 409/201 |
| 6,840,127 B2* | 1/2005 | Moran | B23Q 1/5462 |
| | | | 414/735 |
| 2004/0013509 A1* | 1/2004 | Roy | B23Q 1/5462 |
| | | | 414/735 |
| 2004/0149065 A1 | 8/2004 | Moran | |
| 2006/0245894 A1* | 11/2006 | Merz | B25J 9/104 |
| | | | 414/680 |
| 2011/0240817 A1 | 10/2011 | Lee et al. | |

FOREIGN PATENT DOCUMENTS

| | | |
|---|---|---|
| CN | 103982750 A | 8/2014 |
| CN | 104440870 A | 3/2015 |
| DE | 102007004166 A1 | 8/2008 |
| DE | 102008019725 A1 | 10/2009 |
| EP | 0068930 A2 | 1/1983 |
| EP | 2301726 A1 | 3/2011 |
| EP | 2716921 A1 | 4/2014 |
| GB | 2142606 A | 1/1985 |
| GB | 2251548 A | 7/1992 |
| JP | H04250988 A | 9/1992 |

OTHER PUBLICATIONS

Chinese Office Action; Application No. 201780073276.4; dated Sep. 3, 2021; 7 Pages.

\* cited by examiner

TELESCOPIC SHAFT FOR A PARALLEL KINEMATICS ROBOT

TECHNICAL FIELD

The present invention relates to a telescopic shaft that is configured to connect a base of a parallel kinematics robot to an end effector of the same for the purpose of transferring torque.

BACKGROUND

In parallel kinematics robots there is often a need to transfer torque from a stationary base to a tool on a movable end effector. Since the distance of the end effector from the base varies, telescopic shafts with a universal joint at each end are used for the purpose. It is conventionally known to use telescopic shafts comprising no more than two shafts movable in relation to each other in an axial direction, such telescopic shafts being known e.g. from EP2716921A1, EP2301726A1 and DE102008019725A1.

A problem related to telescopic shafts in parallel kinematics robots is that a telescopic shaft potentially limits a robot's working area. Telescopic shafts namely have their respective maximum and minimum lengths that in their turn define how far away from the base and how close to the base, respectively, the end effector can come. In telescopic shafts comprising no more than two shafts movable in relation to each other in the axial direction the maximum length typically is about twice the minimum length.

There is a desire to allow an increased working area for a parallel kinematics robot by increasing the relation between the maximum and minimum lengths of the telescopic shaft, which in the following disclosure will be termed an "extension factor".

SUMMARY

One object of the invention is to provide an improved telescopic shaft for parallel kinematics robots. A further object of the invention is to provide an improved parallel kinematics robot.

These objects are achieved by the devices according to the invention.

The invention is based on the realization that a working area of a parallel kinematics robot can be increased by increasing an extension factor of a respective telescopic shaft. In order to enable extension factors larger than two, the number of shafts with mutual relative movements between the same in an axial direction needs to be more than two. Additional advantages can be achieved when the relative movements between different pairs of shafts are constrained in relation to each other in a predetermined way.

According to a first aspect of the invention, there is provided a telescopic shaft comprising a first shaft, a second shaft configured to enable a first relative movement in an axial direction between the first and second shafts, and a third shaft configured to enable a second relative movement in the axial direction between the second and third shafts, and a third relative movement in the axial direction between the first and third shafts. The second shaft is located between the first and third shafts. The telescopic shaft is configured to connect a base of a parallel kinematics robot to an end effector of the same for the purpose of transferring torque. By providing the telescopic shaft with more than two shafts with mutual relative movements between the same, the extension factor and by that the working area of the parallel kinematics robot can be increased.

According to one embodiment of the invention the telescopic shaft further comprises constraining means configured to predetermine the first relative movement in relation to the second relative movement. By predetermining the sequence of movements between the shafts the telescopic shaft may be optimized e.g. to minimize the maximum relative velocity between the pairs of shafts, or to minimize the inertial loading caused by the telescopic shaft.

According to one embodiment of the invention, the first relative movement and the second relative movement are configured to occur simultaneously in sync with each other.

According to one embodiment of the invention, the first relative movement and the second relative movement are configured to have same velocities at each instant. By this measure the maximum relative velocity between the pairs of shafts is minimized.

According to one embodiment of the invention, the constraining means comprises at least one of the following construction pairs: a line and a pulley pair, a chain and a sprocket pair, and a rack and a pinion pair.

According to one embodiment of the invention, the first relative movement and the second relative movement are configured not to occur simultaneously.

According to one embodiment of the invention, the third shaft is configured to fully extend in relation to the second shaft before the second shaft starts to extend in relation to the first shaft. By this measure the inertial loading caused by the telescopic shaft is minimized.

According to one embodiment of the invention, the second shaft is configured to fully retract in relation to the first shaft before the third shaft starts to retract in relation to the second shaft. By this measure the inertial loading caused by the telescopic shaft is minimized.

According to one embodiment of the invention, the constraining means comprises at least one of the following: an extension spring, a compression spring, gas spring, and a motor spring.

According to one embodiment of the invention, the telescopic shaft further comprises balancing means configured to balance the effect of gravity.

According to one embodiment of the invention, the balancing means comprises at least one of the following: an extension spring, a compression spring, gas spring, and a motor spring.

According to one embodiment of the invention, the balancing means functions as constraining means configured to predetermine the first relative movement in relation to the second relative movement.

According to a second aspect of the invention, there is provided a parallel kinematics robot comprising a base, an end effector and a telescopic shaft according to any of the preceding embodiments connecting the base to the end effector.

BRIEF DESCRIPTION OF THE DRAWINGS

The invention will be explained in greater detail with reference to the accompanying drawings, wherein.

DETAILED DESCRIPTION

Figure 4:
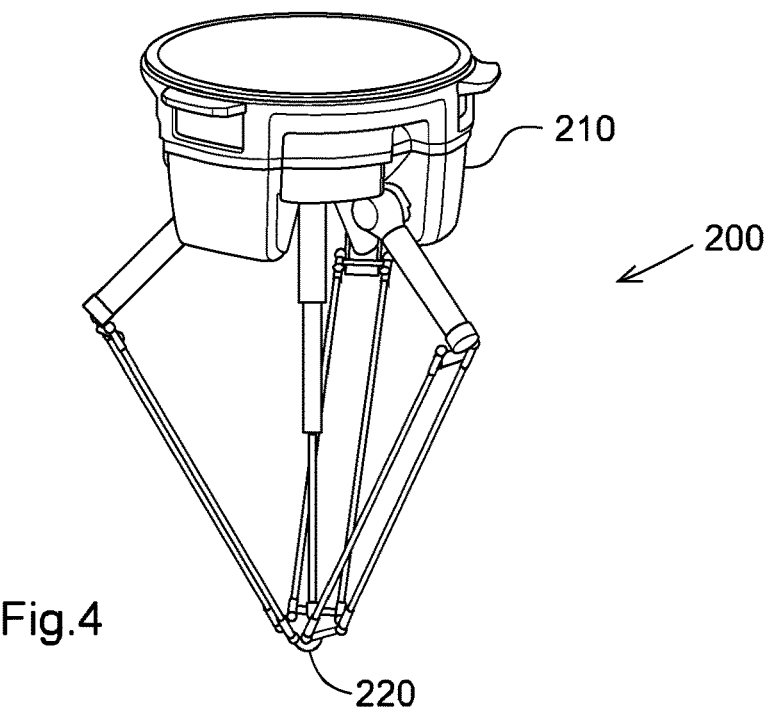
FIG. 4 shows a parallel kinematics robot according to one embodiment of the invention.

Referring to FIGS. 1a-1d, a telescopic shaft 10 according to one embodiment of the invention comprises a first shaft 20, a second shaft 30 and a third shaft 40, whereby all of the three shafts 20, 30, 40 are enabled to move in relation to each other in an axial direction 50 of the shafts 20, 30, 40. In radial direction all of the three shafts 20, 30, 40 are centered about a common longitudinal axis 60. A relative radial movement between the shafts 20, 30, 40 is prevented by means of wheels 70 on one shaft 30, 40 interacting with respective guide tracks 80 on another shaft 20, 30 of each neighboring pair of shafts 20, 30, 40, and thereby torque can be transferred between each respective pair of shafts 20, 30, 40. The first shaft 20 comprises a first fixture 90 for attachment to a base 210 of a parallel kinematics robot 200 (see FIG. 4), and the third shaft 40 comprises a second fixture 100 for attachment to an end effector 220 of the parallel kinematics robot 200.

Figure 1A:
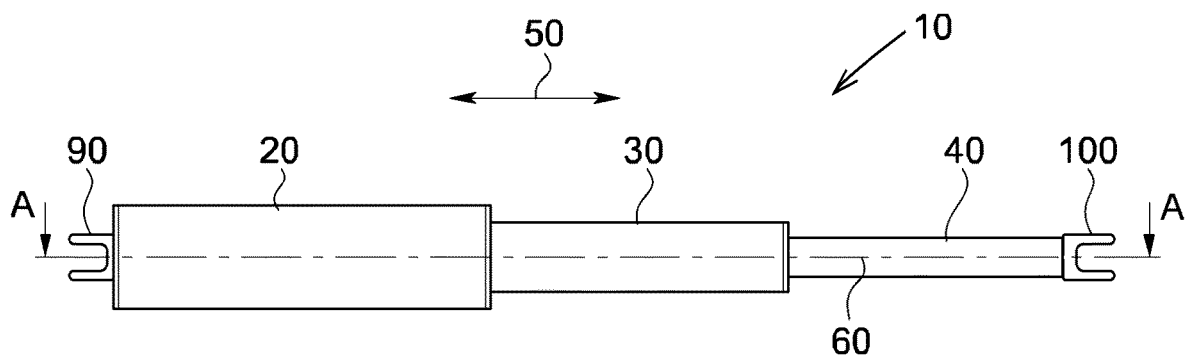
FIGS. 1a-1d show a telescopic shaft according to one embodiment of the invention.
Figure 1B:
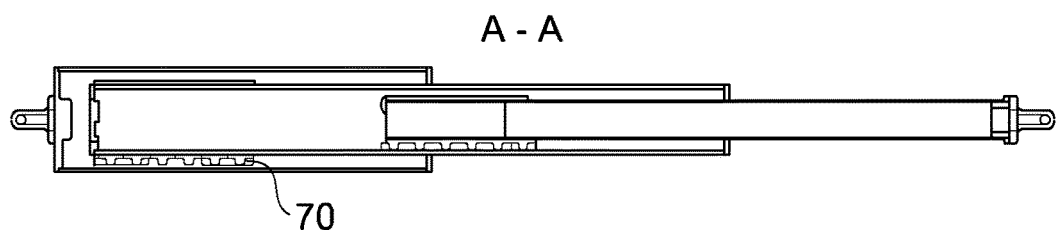
Figure 1C:
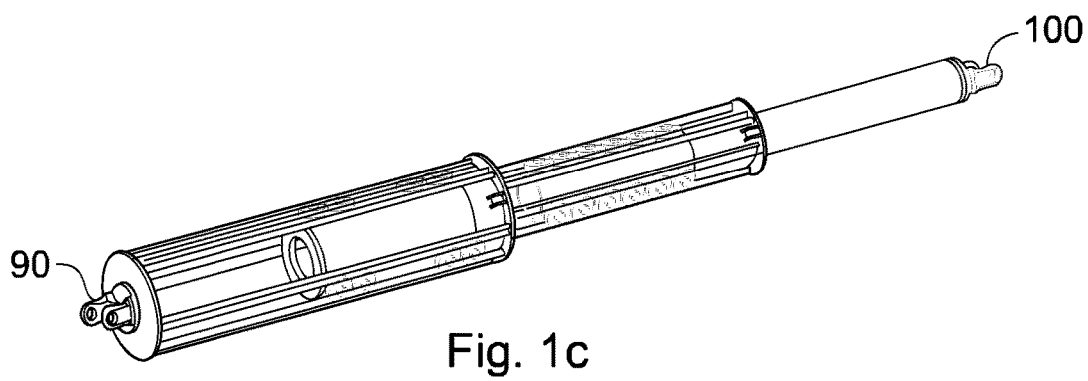
Figure 1D:
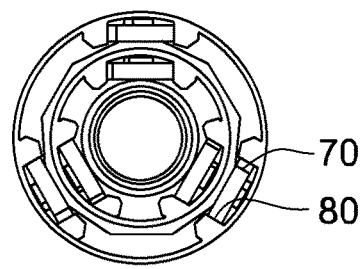
Figure 2:
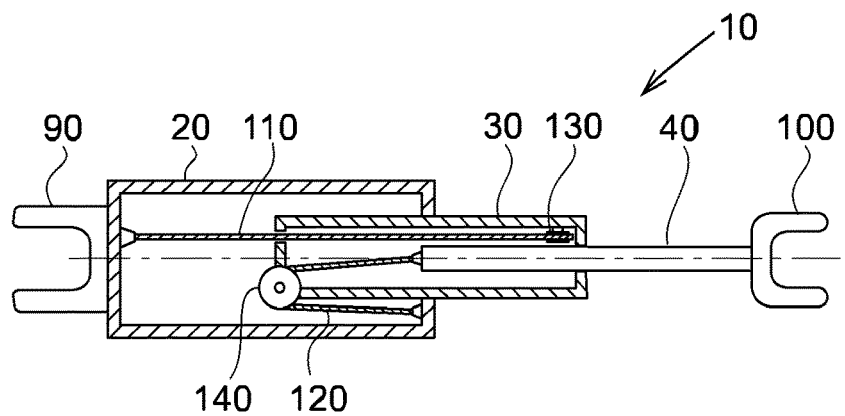
FIG. 2 shows a telescopic shaft according to one embodiment of the invention.

Referring to FIG. 2, the telescopic shaft 10 according to one embodiment of the invention comprises a pulley-line arrangement with a first and second cables 110, 120 fixedly attached to the first and third shafts 20, 40, and first and second pulleys 130, 140 rotatably attached to the second shaft 30. The first cable 110 interacts with the first pulley 130 in such a way that when the third shaft 40 retracts in relation to the first and second shafts 20, 30, the second shaft 30 is caused to retract in relation to the first shaft 20. Correspondingly, the second cable 120 interacts with the second pulley 140 in such a way that when the third shaft 40 extends in relation to the first and second shafts 20, 30, the second shaft 30 is caused to extend in relation to the first shaft 20. A relative movement between the first and second shafts 20, 30 thereby occurs simultaneously in sync and with the same velocity as a respective relative movement between the second and third shafts 30, 40 at each instant. Instead of a pulley-line arrangement many alternative mechanisms can be used to achieve the function of predetermining the simultaneous sequence of relative movements between the shafts 20, 30, 40, such as a mechanism comprising a chain and a sprocket pair, or a rack and a pinion pair. Such mechanisms are known e.g. from U.S. Pat. Nos. 3,118,066A, 3,244,883A and US20110240817A1, the content of which is hereby incorporated into this disclosure by reference.

Figure 3:
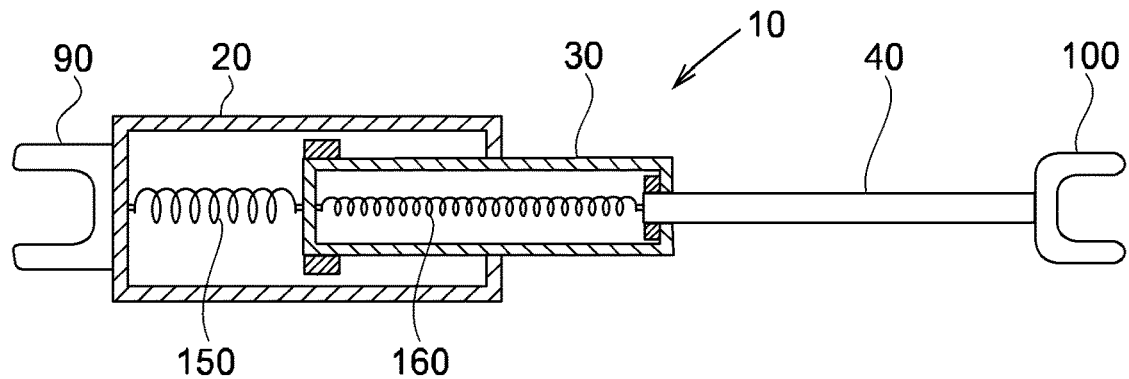
FIG. 3 shows a telescopic shaft according to one embodiment of the invention.

Referring to FIG. 3, the telescopic shaft 10 according to one embodiment of the invention comprises a spring arrangement with a first extension spring 150 fixedly attached to the first and second shafts 20, 30. The first extension spring 150 exerts a pulling force between the first and second shafts 20, 30 in such a way that when the third shaft 40 extends in relation to the first and second shafts 20, 30, the second shaft 30 is caused to remain stationary in relation to the first shaft 20 until the third shaft 40 is fully extended in relation to the second shaft 30. Correspondingly, when the second shaft 30 retracts in relation to the first shaft 20, the third shaft 40 is caused to remain stationary in relation to the second shaft 30 until the second shaft 30 is fully retract in relation to the first shaft 20. A relative movement between the first and second shafts 20, 30 thereby never occurs simultaneously with a respective relative movement between the second and third shafts 30, 40. Instead of a spring arrangement comprising one or more extension springs 150, 160 many alternative mechanisms can be used to achieve the function of predetermining the non-simultaneous sequence of relative movements between the shafts 20, 30, 40, such as a mechanism comprising one or more compression springs, or one or more motor springs.

Further referring to FIG. 3, the first extension spring 150 may also function as a balancing means that balances the effect of gravity. During a typical operation the telescopic shaft 10 is in a substantially vertical position with a hanging load, and gravity thereby acts to extend the telescopic shaft 10. By dimensioning the first extension spring 150 appropriately the telescopic shaft 10 can at least partially balance the effect of gravity. The telescopic shaft 10 of FIG. 3 further comprises a second extension spring 160 which has the sole function of balancing the effect of gravity. For example, the second extension spring 160 can be dimensioned to at least partially balance the effect of gravity, and the first extension spring 150 can be dimensioned to have a slightly larger spring constant than that of the second extension spring 160 so that it, in addition to predetermining the sequence of relative movements between the shafts 20, 30, 40, also contributes to balancing the effect of gravity.

A balancing means balancing the effect of gravity can be used in combination with any type of constraining means predetermining the sequence of relative movements between the shafts 20, 30, 40. For example, the telescopic shaft 10 of FIG. 2 can be provided with a member corresponding to the first extension spring 150 or the second extension spring 160 of the telescopic shaft 10 of FIG. 3. Instead of a spring arrangement comprising one or more extension springs 150, 160 many alternative mechanisms can be used to achieve the function of balancing the effect of gravity, such as a mechanism comprising one or more compression springs, or one or more motor springs.

The invention is not limited to the embodiments shown above, but the person skilled in the art may modify them in a plurality of ways within the scope of the invention as defined by the claims. For example, the telescopic shaft 10 may comprise more than three shafts 20, 30, 40 with mutual relative movements between the same in the axial direction, such as four or any other appropriate number of shafts 20, 30, 40.

The invention claimed is:

1. A telescopic shaft comprising:
   a first shaft,
   a second shaft configured to enable a first relative movement in an axial direction between the first and second shafts,
   a third shaft configured to enable a second relative movement in the axial direction between the second and third shafts, and a third relative movement in the axial direction between the first and third shafts, the second shaft being located between the first and third shafts, and
   constraining means configured to predetermine the first relative movement in relation to the second relative movement,
   wherein the telescopic shaft is configured to connect a base of a parallel kinematics robot to an end effector for the purpose of transferring torque.

2. The telescopic shaft according to claim 1, wherein the first relative movement and the second relative movement are configured to occur simultaneously in sync with each other.

3. The telescopic shaft according to claim 2, wherein the first relative movement and the second relative movement are configured to have same velocities at each instant.

4. The telescopic shaft according to claim 2, wherein the constraining means includes at least one of the following construction pairs: a line and a pulley pair, a chain and a sprocket pair, and a rack and a pinion pair.

5. The telescopic shaft according to claim 1, wherein the constraining means includes at least one of the following construction pairs: a line and a pulley pair, a chain and a sprocket pair, and a rack and a pinion pair.

6. The telescopic shaft according to claim 1, wherein the first relative movement and the second relative movement are configured not to occur simultaneously.

7. The telescopic shaft according to claim 6, wherein the third shaft is configured to fully extend in relation to the second shaft before the second shaft starts to extend in relation to the first shaft.

8. The telescopic shaft according to claim 7, wherein the second shaft is configured to fully retract in relation to the first shaft before the third shaft starts to retract in relation to the second shaft.

9. The telescopic shaft according to claim 7, wherein the constraining means includes at least one of the following: an extension spring, a compression spring, gas spring, and a motor spring.

10. The telescopic shaft according to claim 6, wherein the second shaft is configured to fully retract in relation to the first shaft before the third shaft starts to retract in relation to the second shaft.

11. The telescopic shaft according to claim 6, wherein the constraining means includes at least one of the following: an extension spring, a compression spring, gas spring, and a motor spring.

12. The telescopic shaft according to claim 1, wherein the telescopic shaft further includes balancing means configured to balance the effect of gravity.

13. The telescopic shaft according to claim 12, wherein the balancing means includes at least one of the following: an extension spring, a compression spring, gas spring, and a motor spring.

14. The telescopic shaft according to claim 12, wherein the balancing means functions as constraining means configured to predetermine the first relative movement in relation to the second relative movement.

15. A parallel kinematics robot comprising a base, an end effector, and a telescopic shaft connecting the base to the end effector for transferring torque, the telescopic shaft including:
 a first shaft,
 a second shaft configured to enable a first relative movement in an axial direction between the first and second shafts,
 a third shaft configured to enable a second relative movement in the axial direction between the second and third shafts, and a third relative movement in the axial direction between the first and third shafts, the second shaft being located between the first and third shafts, and
 constraining means configured to predetermine the first relative movement in relation to the second relative movement.

* * * * *